United States Patent [19]
Iknaian et al.

[11] Patent Number: 5,717,729
[45] Date of Patent: Feb. 10, 1998

[54] LOW SKEW REMOTE ABSOLUTE DELAY REGULATOR CHIP

[75] Inventors: Russell Iknaian, Groton; Richard B. Watson, Jr., Harvard, both of Mass.

[73] Assignee: Digital Equipment Corporation, Maynard, Mass.

[21] Appl. No.: 269,237

[22] Filed: Jun. 30, 1994

[51] Int. Cl.$^6$ .............. H04L 7/00; H04L 7/02; G06K 5/04
[52] U.S. Cl. .......... 375/356; 375/354; 375/371; 371/1; 327/153; 327/161; 327/276
[58] Field of Search .............. 375/354, 356, 375/371; 371/1; 370/108, 516, 517, 519; 327/141, 152, 153, 292, 161, 276

[56] References Cited

U.S. PATENT DOCUMENTS

| | | | |
|---|---|---|---|
| 4,496,861 | 1/1985 | Bazes | 327/161 |
| 4,833,695 | 5/1989 | Greub | 371/1 |
| 5,059,838 | 10/1991 | Motegi | 327/276 |
| 5,235,521 | 8/1993 | Johnson et al. | 364/489 |
| 5,258,660 | 11/1993 | Nelson | 327/141 |
| 5,272,729 | 12/1993 | Bechade | 375/371 |
| 5,278,466 | 1/1994 | Honoa | 327/565 |
| 5,298,866 | 3/1994 | Kaplinsky | 327/41 |
| 5,336,940 | 8/1994 | Sorrells | 327/276 |
| 5,369,640 | 11/1994 | Watson | 327/141 |
| 5,410,750 | 4/1995 | Cantwell | 375/349 |

Primary Examiner—Curtis Kuntz
Assistant Examiner—Vijay Shankar
Attorney, Agent, or Firm—Diane C. Drozenski; Ronald C. Hudgens; Arthur W. Fisher

[57] ABSTRACT

A remote delay regulator circuit measures the effects of intrinsic propagation delays experienced by a system clock signal propagating through an extended clock distribution path that encompasses a clock repeater chip, a module transmission network and a clock distribution network of an integrated circuit (IC) chip. Delay measurement of the associated (IC) chips on the module is provided by sensing the clock signal at the beginning of the network and at the end of the network. The BEFORE and AFTER sense taps are routed to a signal generation circuit on the repeater chip where measurement signals are generated that define the beginning and end of a measurement cycle. A clock delay path circuit on the repeater chip contains the logic circuitry required to measure and compensate for the actual measured intrinsic propagation delays of the total clock transmission network. The repeater chip includes an additional unconnected, but identically loaded, delay line connected to turn on whenever any of the delay lines turns off, thereby preventing power surges and power supply voltage noise, and reducing temperature variations.

16 Claims, 14 Drawing Sheets

LOW SKEW REMOTE ABSOLUTE DELAY REGULATOR CHIP

BACKGROUND OF THE INVENTION

This invention relates generally to the distribution of clock signals in a computer and, more specifically, to the distribution of clock signals to their "points-of-use" in various integrated circuit chips.

In a synchronous computer system having a bidirectional bus, one of the signals transmitted to the bus interface circuits on each module of the system is a clock signal used to control the timing of data transfer operations. Specifically, the clock signal synchronizes the transmission and reception of data between physically separated points on the bus.

For proper operation of the computer system, clock signals should arrive at the bus interface circuitry at the same time; otherwise, reliable data transmission is not ensured. For example, if a bus interface circuit receiving data is "clocked" later than others, the earlier-clocked bus interface circuit may overwrite the data before it is stored at its proper destination. This lack of simultaneity in reception of the clock signals, i.e., clock skew, directly increases the amount of time that the data must remain stable on the bus to ensure reliable data transmission; this, in turn, increases the time required for each data transfer on the bus and, thus reduces the speed of the bus.

The amount of clock skew introduced into a computer system is a direct function of the variations in propagation delays among the clock receiver chips, and of the velocity factor differences in the module conductor etch of the system. In digital logic applications, a transistor switches "on", when saturated, and "off", when nonconducting, to generate full "signal" swings between two power supply voltages. The signals are in the form of "high" and "low" states of the output voltage of the transistor. Propagation delay is affected by the switching speed of the transistor and is highly dependent upon variations in the fabrication process of the chip. In addition, the applied voltage, the operating temperature and the loading conditions of the chip affect its switching speed.

For logic switching applications, the transistors of a chip are typically configured as inverter and buffer circuits. An inverter "inverts" the logic sense of a binary signal; a buffer is used merely for signal amplification. That is, the buffer circuit does not produce any particular logic function since the binary value of the output is the same as the binary value of the input. However, buffering of low-level signals with semiconductor chips to develop high-level digital pulse signals is very susceptible to propagation delay variations due to process, voltage, temperature and loading (PVTL) variations. Differences in propagation delay between clock "buffer" chips in a system directly translate into skew between clock signals in different parts of the system. Removing propagation delay, and thus delay differences, is not physically possible; however, adding delay to make all of the delays the same, is possible.

The problem of clock skew is addressed partly by employing a central system clock source and distributing the clock signals to the respective modules. Distribution is accomplished in a manner such that the clock signals arrive essentially simultaneously at the various modules. In each module, the incoming clock signals are typically processed, i.e., shaped and amplified, before use by various integrated circuit (IC) chips on the module. Such processing necessarily delays the signals; the delays can be expected to vary from module to module because of PVTL variations among the different clock buffer chips. In addition, the clock distribution network located on each IC chip of each module can be expected to vary from chip to chip. These variations contribute significantly to clock skew and the present invention is directed to the reduction of the skew. More specifically, the present invention is directed to delivering low-skew clock signals to points on the individual IC chips where the clock signals are actually used, i.e., at their "points-of-use".

There are two typical methods for reducing the clock skew problem, the addition of measured delays to resynchronize the various lines, or the use of a Phase Locked Loop (PLL). A PLL is a device which continually strives to track the frequency of an input signal. The frequency of a Voltage Controlled Oscillator (VCO) signal is compared with that of the input signal using a phase comparator that produces an error voltage proportional to their frequency difference. This error voltage is used to control the frequency of the VCO. Specifically, filtering of the error voltage involves a trade-off determination between acquisition time, ie the time it takes to "lock" the frequency of the VCO to the average frequency of the input signal, versus the "jitter", ie phase noise.

The problem with the PLL approach is that jitter is a major contribution to clock skew. In addition, replication of input and output circuitry in the PLL feedback path is needed for accurate phase tracking, while separate loops are required for each clock phase. Each PLL in the system contributes to the overall clock skew by contribution its own phase-offset error depending on variations between the PLL due to VCO, filter and phase detector Processing, voltage, temperature and loading (PVTL).

An example of a prior art technique used to reduce PVTL-caused clock skew is disclosed in an article titled, CLOCK BUFFER CHIP WITH ABSOLUTE DELAY REGULATION OVER PROCESS AND ENVIRONMENTAL VARIATIONS, by Watson et al., from 1992 IEEE Custom Integrated Circuit Conference. Here, a delay regulator circuit of a clock repeater chip located on a computer module performs a precise measurement of the propagation delay of a clock signal processed by the repeater chip and adjusts that delay to a standard value prior to distributing the processed clock signal to other IC chips on the module. Each repeater chip provides an interface between a globally-distributed (system) input clock signal and corresponding locally-distributed (module) output clock signals. By adjusting the delay in the chip, a fixed-phase relationship is maintained between the input and output clock signals.

Delay regulation in accordance with the above-described technique is performed with a replica loop circuit on the repeater chip that replicates the internal path delay of that chip. The delay regulator circuit described in this paper could also perform a measurement of the propagation delay of a replica of the internal clock distribution path of each IC chip that receives the processed clock signal. This would require extending the replica loop circuit onto the respective IC chip. This approach could allow the repeater chip to regulate delay originating both in itself and in these respective IC chips, in limited fashion.

However, the extended portion of the replica loop on each IC chip would require a significant number of components to accurately simulate the internal clock distribution network of that IC chip, thereby increasing the size and cost of that chip. Furthermore, each respective IC chip requires an unregulated output buffer which itself is subjected to PVTL conditions different from those experienced by the repeater chip and the other IC chips, thereby introducing inaccuracies.

Another approach known in the art is so-called relative regulation. The prior art approach of relative regulation attempts to accurately simulate the internal clock distribution network of a IC chip using a delay line, to regulate the clock delays within a given chip, and assure that the clock signals are timed to be received at the proper times. An absolute delay regulator on the other hand simulates or measures the clock distribution network of the entire system, including the conductors of the printed circuit board, and attempts to hold the whole system within a specified skew limit.

One of the problems with the above mentioned relative delay regulation technique is that there is high overhead, or lost space on each of the point-of-use chips associated with the delay lines used to simulate the delay of that particular chip. Another problem is the possibility of 'on die' temperature and operating voltage variations within the various components of the regulator system. Both temperature and operating voltage variations have an effect on the signal delays, and limit the accuracy of the comparison between the simulation delay line and the actual delay.

Yet another example of an approach used to reduce PVTL-caused clock skew is an absolute delay regulation system that addresses the problem of the large overhead associated with each point-of-use chip having a large delay line to simulate the clock delays on that particular chip. This approach remotely measures, in real time, the effects of propagation delays using the actual clock distribution network of an integrated circuit chip coupled to a clock repeater chip. This approach uses a delay line on the clock repeater chip rather than on all of the point of use chips. This greatly reduces the lost chip area, although there still are two output devices on each of the point-of-use chips, one tap for the before clock pulse measurements, and one tap for the after clock pulse measurements.

One problem with this approach is that no allowance is made for potential on-chip process and temperature variations which cause drift or offset in the clock timing. Another problem is transient voltage variations known as 'voltage bouncing', between the three delay lines used for measurement and reference. Such process variations and temperature and voltage variation induced changes cause noise and timing offsets, which reduces system operating frequency and thus is undesirable. Thus the accuracy of the delay measurement, while better than previous methods, is not as good as current technology may require because of uncertainty in the delay measurement. Thus the speed of the bus is not as high as current devices may require.

A potential problem with absolute delay regulators is that not all of the associated IC chips on a module will have the two necessary output devices, one tap for the before clock pulse measurements, and one tap for the after clock pulse measurements. The present invention presents a solution to this problem as well as the basic uncertainty in delay measurements.

SUMMARY OF THE INVENTION

In accordance with the present invention, an apparatus for reducing clock skew includes a clock delay circuit for measuring and compensating for intrinsic propagation delays of a clock signal path during a measurement cycle, with the clock delay circuit configured to receive the system reference clock signal and provide a low-skew, low time offset, with respect to the system reference clock, clock signal to a point-of-use circuitry on an associated IC chip. The clock delay circuit further includes a plurality of delay lines and means for maintaining a constant power consumption of the clock delay circuit during power up and power down cycles of the delay lines. With such an arrangement the means for maintaining constant power consumption results in a constant circuit temperature and a reduction in voltage swings. The reduction in temperature and voltage variations reduces the circuit noise sensitivity and decreases the circuit skew and offset.

In accordance with a further application of the present invention, the clock delay circuit uses the same delay lines and associated circuitry for both measuring the necessary intrinsic propagation delay offset and for imposing the measured delay offset on the clock signal to the point-of-use circuitry with such an arrangement the variations in temperature, voltage and processing between two different chips on a computer module, and the wiring and module manufacturing variations are accounted for and effectively eliminated as a source of clock skew and offset.

In accordance with yet a further application of the present invention, the situation in which not all of the associated integrated circuit (IC) chips on the module do contain the necessary point-of-use chip circuitry, the propagation delay is imposed by reference to an adjacent associated integrated circuit (IC) chip which does contain the necessary point-of-use chip circuitry.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
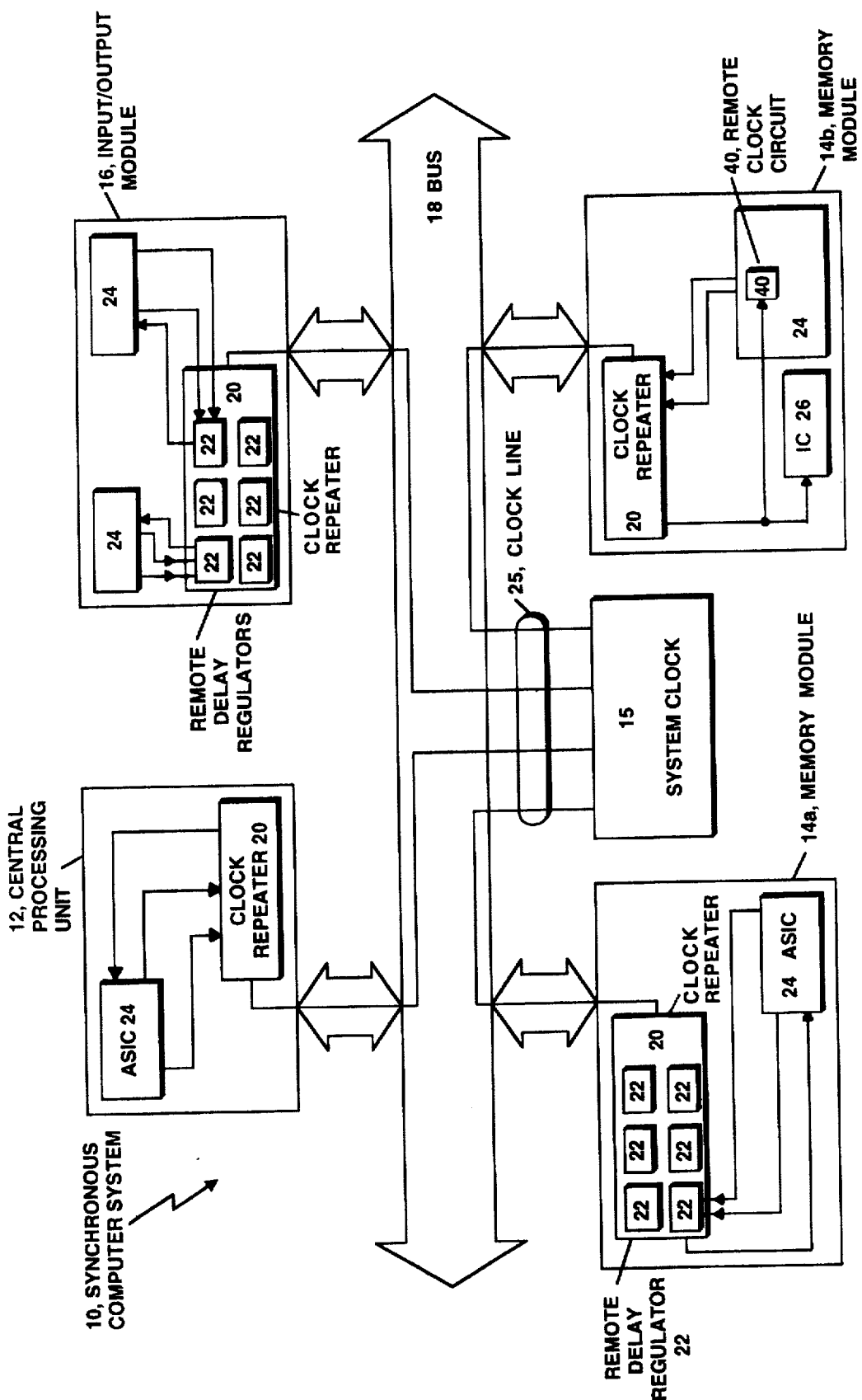
FIG. 1 is a block diagram of a computer system including modules having a clock repeater chip for receiving a globally distributed system clock signal.

Referring to FIG. 1, a synchronous computer system 10 typically includes a central processing unit module 12, main memory modules 14a, 14b and an input/output unit module 16 interconnected by a high-speed, bidirectional synchronous bus 18. A clock module 15 generates system clock signals to synchronize the bus operations of the computer system. The system clock signals are globally-distributed via separate, generally radial, unidirectional clock lines 25 of the synchronous bus 18 to each module of the computer 10.

A clock repeater chip 20 located on each module receives the distributed .system clock signals as input signals. Each module may contain more than one clock repeater chip 20. The repeater chip 20 is preferably a VLSI CMOS custom-integrated circuit chip, containing a plurality of remote delay regulator circuits 22, functionally configured to process, i.e, shape and amplify, each input signal. The resulting output clock signal, which may, for example, be a pulse train having a 10 nanosecond (nsec) period, is thereafter distributed to a plurality of other associated integrated circuits, for example, but not limited to, application specific integrated circuitry (ASIC) 24, on the module, each of which contain a remote clock circuit 40. In the case in which an associated integrated circuit does not contain a remote clock circuit 40, shown in FIG. 1, module 14b as IC 26, the propagation delay is imposed by reference to an adjacent IC such as ASIC 24. In a typical system, processing circuitry located on chip 20 converts controlled-edge, system clock signals with low-level voltages to rail-to-rail, 50% duty cycle digital pulses required by the ASIC chips 24, in this example.

Figure 2:
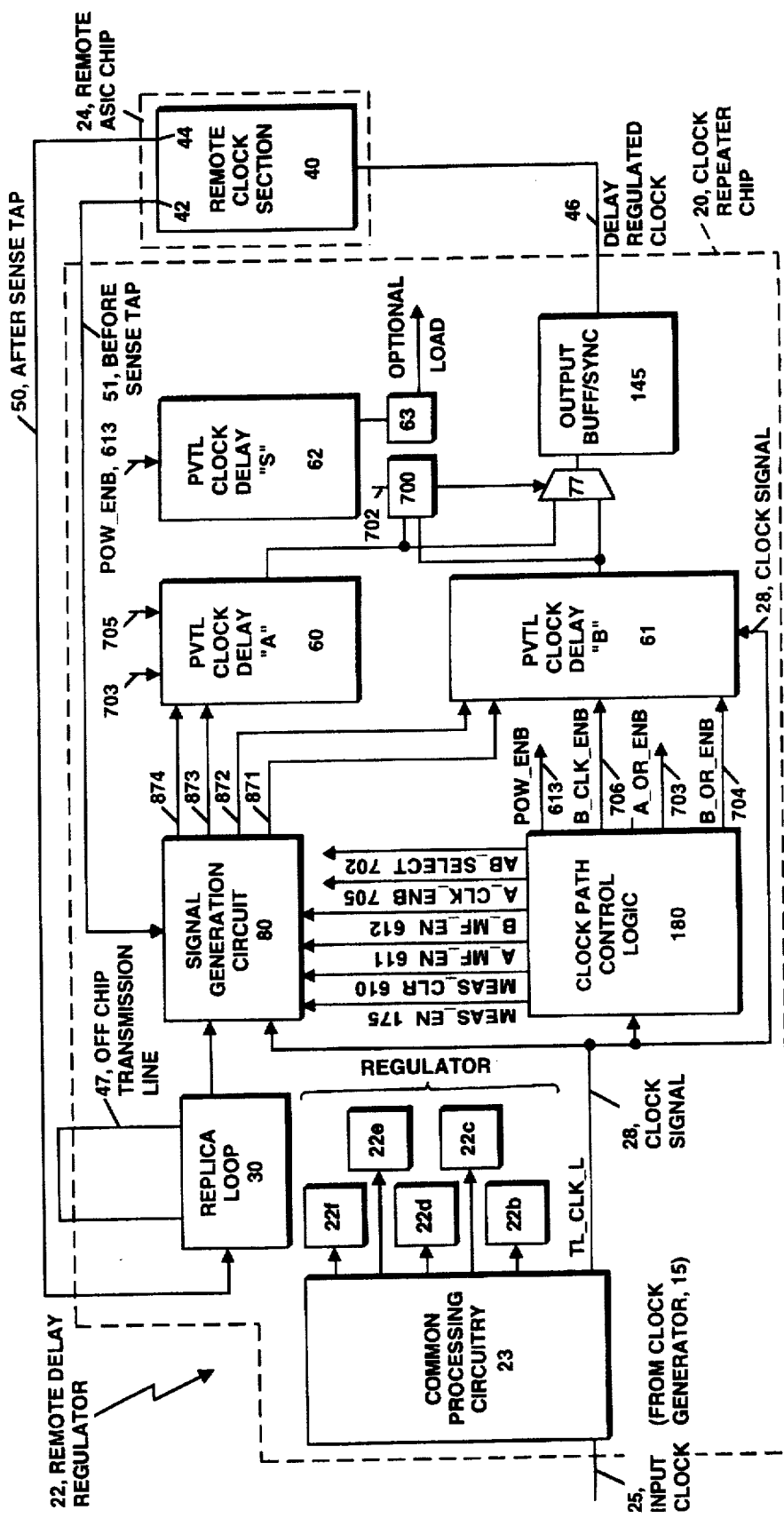
FIG. 2 is a block diagram of a remote delay regulator in accordance with the invention.
Figure 9:
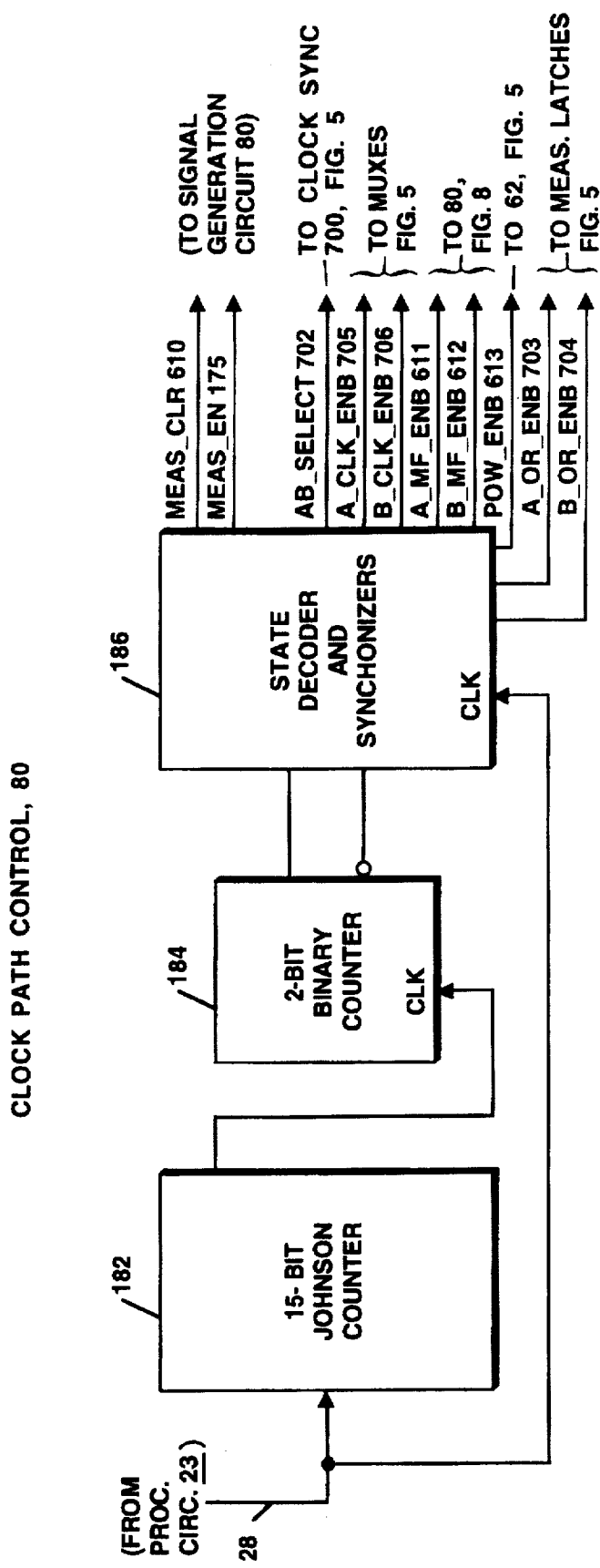
FIG. 9 is a block diagram of a clock path control logic unit of the delay regulator.

Referring to FIG. 2, a remote delay regulator circuit 22 operates in a cyclical fashion by periodically measuring the effects of propagation delay experienced by a system clock propagating through an extended clock distribution path encompassing the repeater chip 20, an ASIC chip 24 and the clock etch transmission line 46 connecting the two chips on the same module. Specifically, the regulator 22 includes a remote clock circuit section 40 located on the ASIC chip 24, the details of which will be described in conjunction with FIG. 4, in addition to a signal generation Circuit 80, the details of which will be described in conjunction with FIG. 10, a clock path control logic unit 180, the details of which will be described in conjunction with FIG. 9, a PVTL clock delay circuits 60 and 61, the details of which will be described in conjunction with FIG. 5, and an unconnected PVTL clock delay circuit 62, either with or without an additional load 63, which is turned on to maintain consistent power consumption whenever either of the other two delay circuits 60 or 61 are turned off. The clock repeater chip also includes a "replica loop" circuit 30, the details of which will be described in conjunction with FIG. 3, located on the repeater chip 20, and an 'off chip' transmission line 47 designed to replicate the clock etch transmission line 46 connecting the two chips on the same module.

The regulator 22 assesses the insertion delay of the extended path introduced by two distinct semiconductor chips, i.e., the repeater chip 20 and the associated IC chip, e.g. the ASIC chip 24, and their connecting transmission line etch 46. Insertion delay is assessed by measuring the effects of the extended path's intrinsic propagation delay and subtracting the time remaining until the next clock period boundary. This approach eliminates discrepancies resulting from PVTL differences between the chips 20 and 24 when reducing clock skew in the system by regulating the insertion delay. After assessing the insertion delay, as described below, one of two delay adjusting units of the clock delay circuits 60 and 61 (see FIG. 5) is updated, while the other delay unit measures the effects of the actual propagation delay of the extended path from a previous measurement cycle. The regulator 22 updates a delay unit by adding the insertion delay, i.e., sufficient controlled amounts of unit delay, to the clock signal on line 28 using delay lines in the adjustment units. The accuracy of the delay measurement and the delay insertion is maintained by using the same circuits to measure and insert the delay.

The insertion delay is regulated at the "point-of-use" within the ASIC chip 24, i.e., the point-in the chips's circuitry where the clock signals are actually used. For the illustrative embodiment described herein, the point-of-use is at the end of the clock distribution network located on the remote clock circuit section 40 of the ASIC chip 24. This delay-regulated clock signal also has a fixed-phase relationship with the input system clock signal on line 25 and with other regulated clock signals emanating from other repeater chips of the computer system at their points-of-use.

In the illustrative embodiment described herein, there are shown five (5) additional signals supplied from the common processing circuitry 23 for feeding corresponding ones of additional remote delay regulators, designated 22b–22f, located on each repeater chip 20, for a total of six (6) remote delay regulators per repeater chip. Each portion is coupled at one end to common processing circuitry 23 and at the other end to an associated ASIC chip 24 via a clock synchronizer unit 700, a mux 77, and an output buffer unit 145. The processing circuitry 23 includes differential and post-amplifier circuitry for producing square wave pulses having a desired amplitude. The output buffer unit 145 includes tri-state driver circuitry used to distribute these processed signals to the ASIC chip 24.

Because of the global-clock distribution arrangement employed in the computer 10, all skew produced in the system is embedded in the repeater chips 20, the ASIC chips 24 and their connecting transmission lines 46. The fixed-phase relationship between input system clock signals on line 25 and the delay-regulated clock signals at the point-of-use on each ASIC chip 24 is maintained by adding an integer number of clock cycles of delay to each input clock signal. Since "in-phase" digital clock signals are exact images of each other, the waveforms of an undelayed clock signal and a clock signal delayed by an integer number of in-phase cycles are identical. The amount of added delay is generally based upon the intrinsic delay characteristics of each repeater chip 20, each ASIC chip 24 and each respective transmission line 46.

Figure 3:
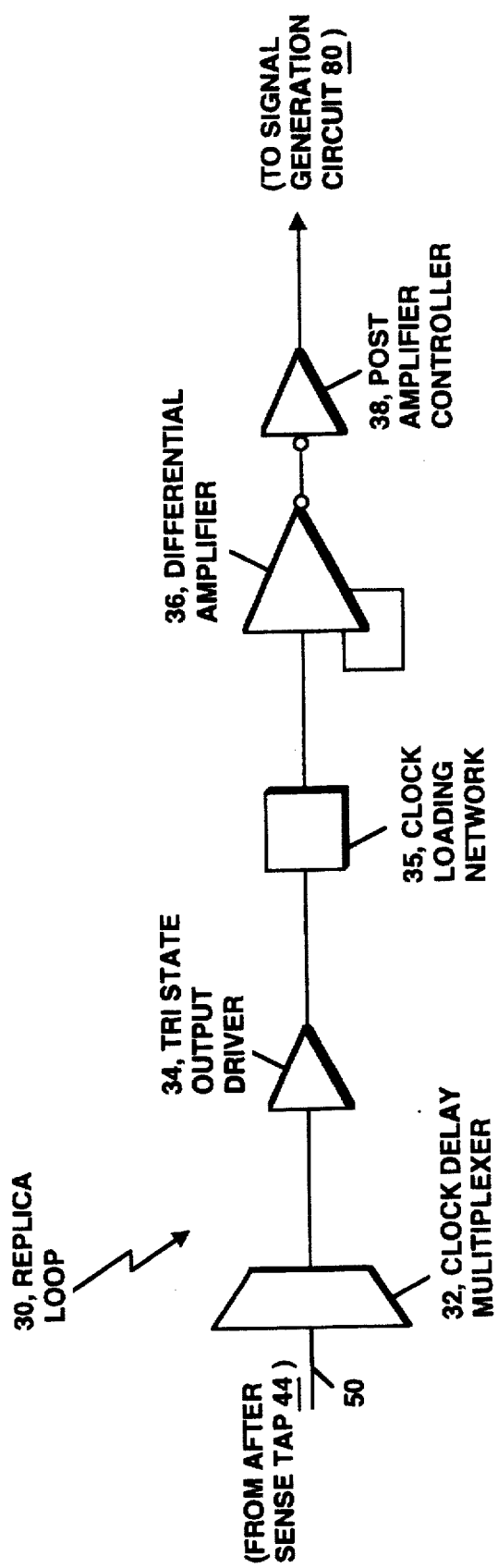
FIG. 3 is a block diagram of a replica loop of the delay regulator.

Referring to FIG. 3, the replica loop circuit 30 of the delay regulator 22 is shown. The replica loop 30 simulates, in part, the logic and propagation delays of the PVTL clock circuits 60 and 61 on the repeater chip 20. Logic circuitry within the replica loop includes (i) a select and clock delay multiplexer segment 32; (ii) a tri-state output driver segment 34; (iii) a clock loading network segment 35 that typically includes an off-chip transmission line (ie line 47 from FIGS. 2 and 4) of electrical length equal to the output clock line 46; (iv) a differential amplifier segment 36; and (v) a post-amplifier stage 38. The logic 30 specifically replicates the transistor sizes and layout parasitics, together with the transmission line 46 located in the extended clock distribution path of the invention.

Figure 4:
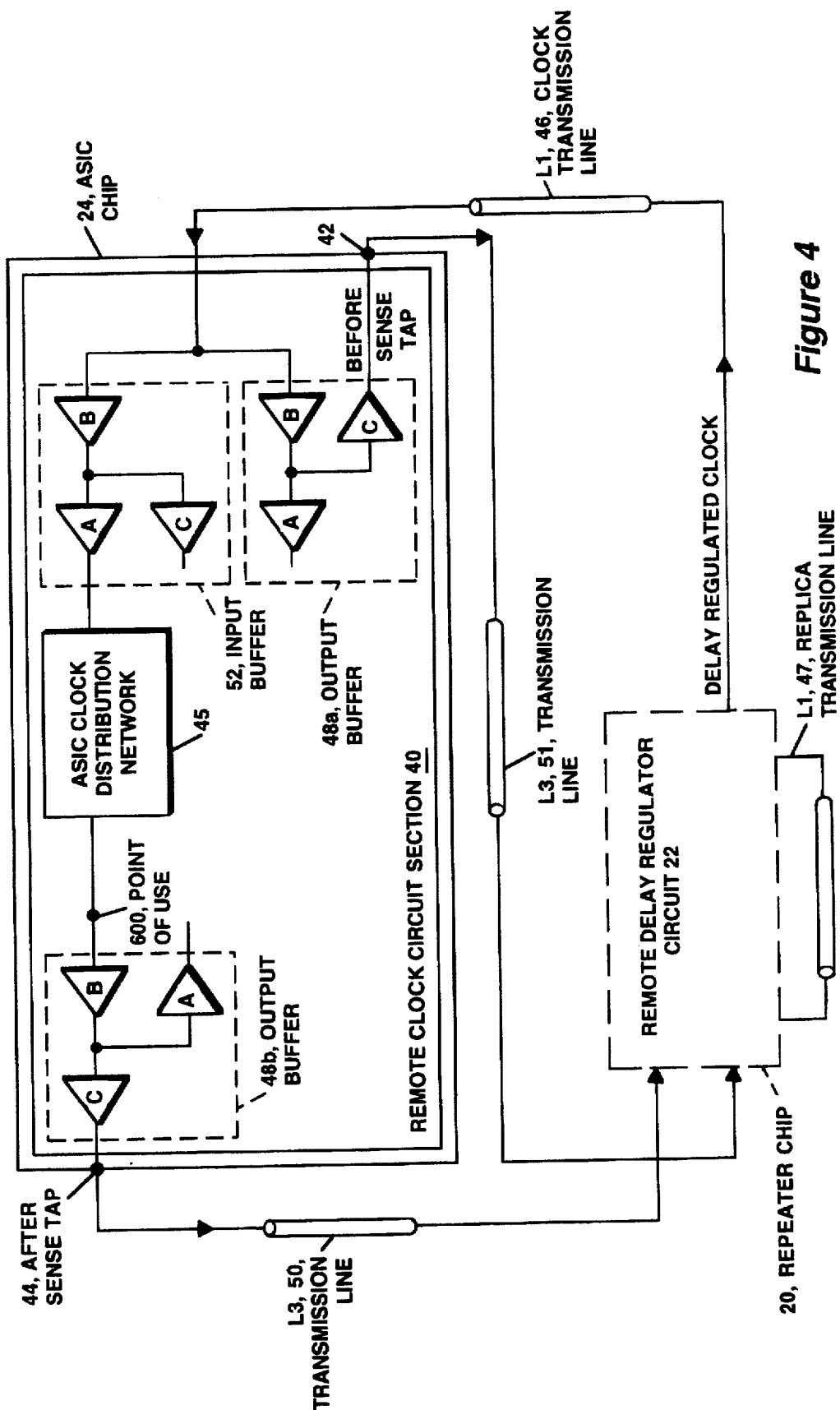
FIG. 4 is a block diagram a remote clock circuit section of the delay regulator in accordance with the invention.

Referring now to FIG. 4, a typical embodiment of the remote clock circuit section 40 of the remote delay regulator 22, including the actual clock distribution network 45 of an associated ASIC chip 24 is shown. As described herein, the remote circuit 40 enables real, as opposed to simulated, measurement of the propagation delay effects on the ASIC overhead clock distribution circuitry. In general, the associated IC chip, here the ASIC chip receives a delay-regulated clock signal on transmission line 46 from the repeater chip 20 and transmits two sense clock signals, i.e., a BEFORE clock signal and an AFTER clock signal on transmission lines 50, 51, to the repeater chip. This enables the remote delay regulator 22 to measure and adjust for the delay introduced by the ASIC chip 24, while compensating for the delay introduced by itself. As noted, a separate remote delay regulator and a separate replica transmission line 47 is needed for each associated IC chip, primarily because the clock distribution delays typically vary among the associated IC chips, such as ASIC chips 24, of the system 10.

The remote clock circuit section 40 has sense taps located at the beginning of the distribution network i.e., the BEFORE tap 42, and at the end of the network, i.e, the AFTER tap 44. The taps 42, 44 relay instances of the delay-regulated clock signal traveling through the ASIC chip network 45 to the repeater chip 20. As with the delay-regulated clock signal on line 46, the BEFORE and AFTER clock signals are nominally 10 nsec pulse trains. The sense taps enable measurement of the delay introduced by the ASIC chip 24 at the end of the clock distribution network 45, designated at 600, which is the point where the clock signal is used to perform application-specific operations with the system bus 18. The remote circuit section 40 thus eliminates the need for extending the replica loop circuit 30 onto the associated IC chip to simulate the clock distribution network 45. Such a replica loop would typically add a significant number of logic gates to the IC chip and consume a significant area of that chip.

The delay-regulated clock signal from the repeater chip 20 is transmitted to the associated ASIC chip 24 over a first circuit board etch transmission line 46 having an arbitrary electrical length L1. An input buffer cell 52 connects the first transmission line 46 to the beginning of the distribution network 45. One requirement of the invention is that the electrical length of the transmission line 47 connected to clock loading network segment 35 in the replica loop circuit 30 be equal to the electrical length of the output clock transmission line 46 connecting the portion of the remote delay regulator 22 on the repeater chip 20 to a respective ASIC chip 24.

As noted, each respective IC chip has two taps, the BEFORE tap 42 and the AFTER tap 44. These taps have equivalent output buffer cells 48a, 48b that connect to a pair of second circuit board etch transmission lines 50, 51, each having an electrical length L3. Another requirement is that the pair of second transmission lines 50 and 51 used to transfer the delay-regulated clock signals propagating along the clock network of each ASIC chip 24 to the repeater chip 20 have an electrical length equal to L3 on a per-target basis throughout the system 10. In other words, the electrical lengths of the transmission lines 50, 51 of a BEFORE and AFTER tap pair connecting the associated IC chip to its respective remote delay regulator circuit on a repeater chip 20 must be equal; however, the lengths L3 of the pair of second transmission lines can differ from one target IC chip to another.

The input cell 52 and each output cell 48 comprise three buffer circuits, e.g., buffers A, B and C, configured as an "equilibrating circuit". In general, buffers A and B amplify the input clock signal and ensure crisp rise and fall times on the internal clock network 45 of the ASIC chip 24. Input buffer B also drives sense output buffer C. Specifically, buffer A is configured to drive the internal clock network 45, buffer B is configured to respond consistently to varying edge rates and buffer C is configured to drive the sense transmission lines 50, 51 back to the remote delay regulator 22 on the repeater chip. The purpose of the output buffer cells 48a,b is to preserve the phase relationship between the ASIC input clock signal at the end of the transmission line 46 and the clock signal at the output of the ASIC clock distribution network 45, i.e., the point-of-use destination 600. The PVTL-dependent delay between the ASIC input clock signal and the point-of-use 600 is the key delay required for remote delay regulation.

In summary, the requirement for equivalent output buffer cells 48 and equivalent transmission lines 50 ensures that the delay introduced by the associated IC chip is accurately transmitted "off-chip" to the respective remote delay regulator circuit 22 on the repeater chip 20. Furthermore, the use of equivalent output cells and transmission lines ensures that the transmitted sense clock signals will experience the same delay and, thus, the effects of the cells and transmission lines will cancel.

Figure 5:
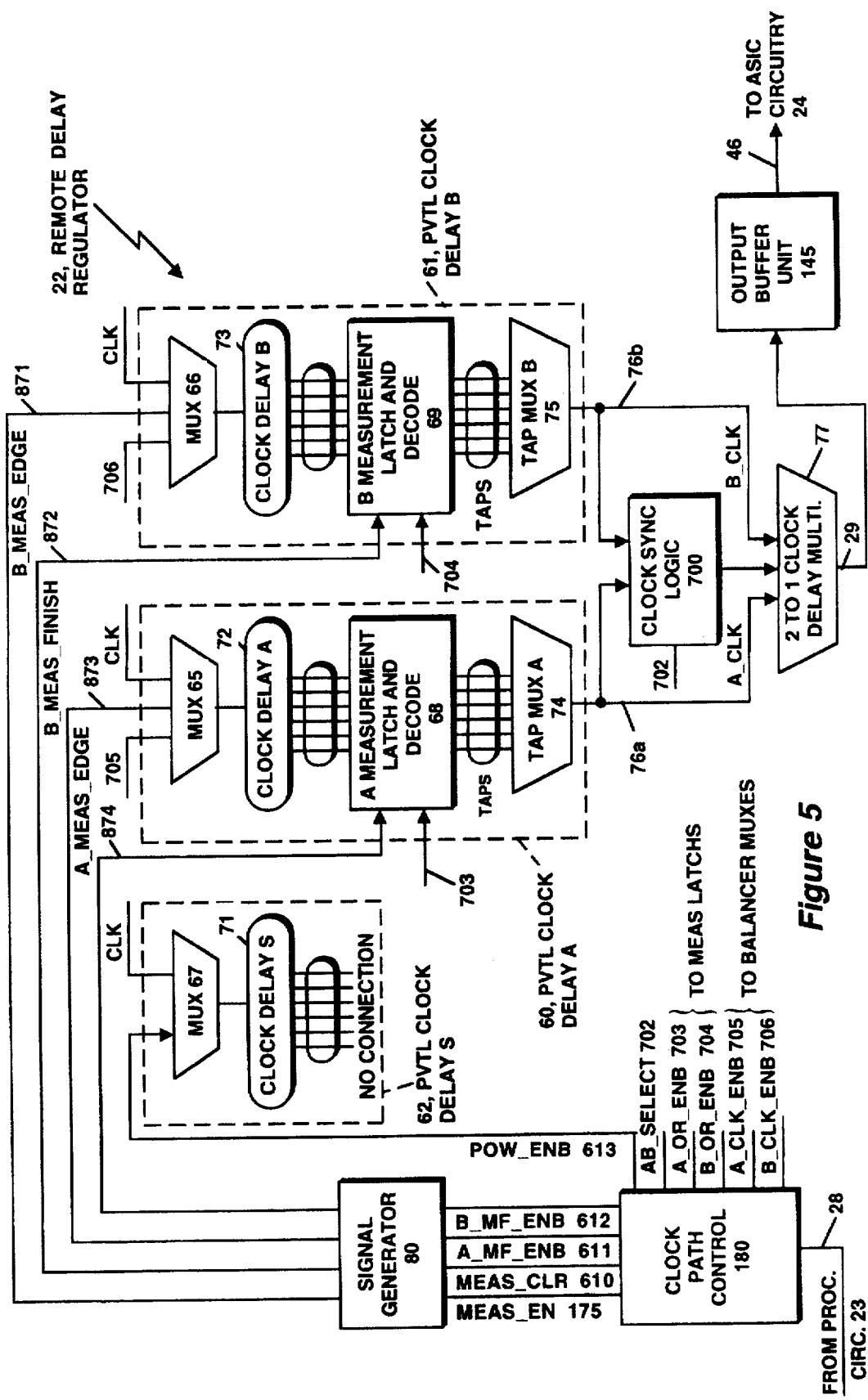
FIG. 5 is a block diagram of a PVTL clock delay circuit of the delay regulator.

Referring now to FIG. 5, the PVTL clock delay circuits 60 and 61 of the remote delay regulator 22 are shown to include muxes and decoders coupled to each delay line. The technique set forth herein provides absolute regulation of clock delay output from the repeater chip. The delay regulator input clock phase is maintained very close to the clock phase at the point-of-use on the remote ASIC chip. The technique introduces delay to align the regulated and input clock phases. The technique of the present invention regulates delay to the next integral clock period using a "modulo-measurement" approach, as discussed below.

The clock delay circuits 60 and 61 includes logic circuitry used to measure and compensate for the effects of the intrinsic delay in the clock distribution path extending among the repeater chip 20, ASIC chip 24 and the etch lines connecting the chips. The data path of the delay circuits 60 and 61 are preferably three hundred and twenty-four bits wide. As described below in connection with FIG. 9, the intrinsic delay of the ASIC clock network, the output clock taps and the replica loop circuit change the phase relationship between the measurement signals MEAS_EDGE on lines 871, 873 and MEAS_FINISH on lines 872, 874, which signals define the measured time interval. This time interval is exactly the delay that is to be added in the clock delay circuit path to "align" the clock signal at the point-of-use with the input clock signal.

Figure 6A:
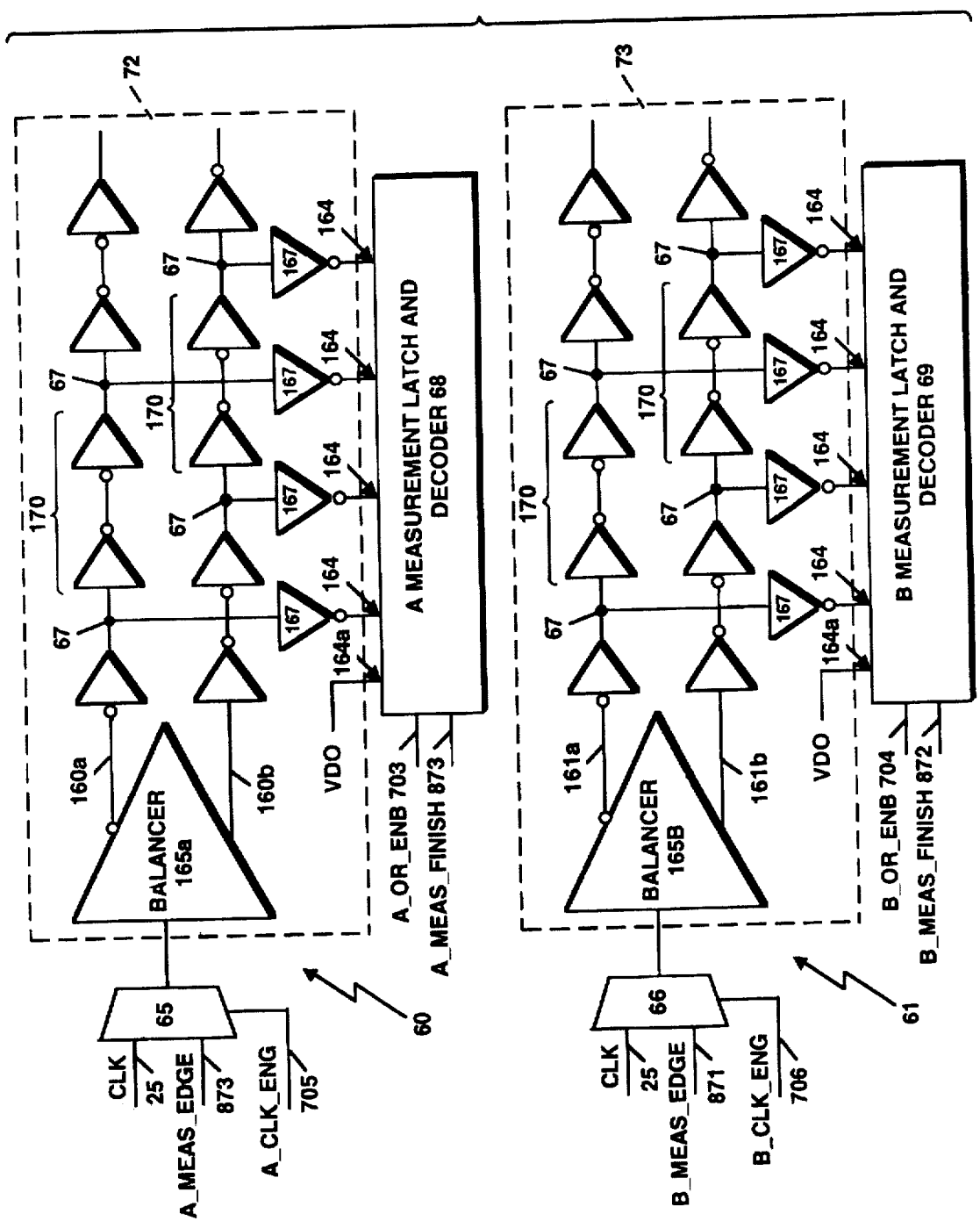
FIG. 6 is a diagram of a fine-grain, tapped delay line located within the clock delay circuit of FIG. 5.
Figure 6B:
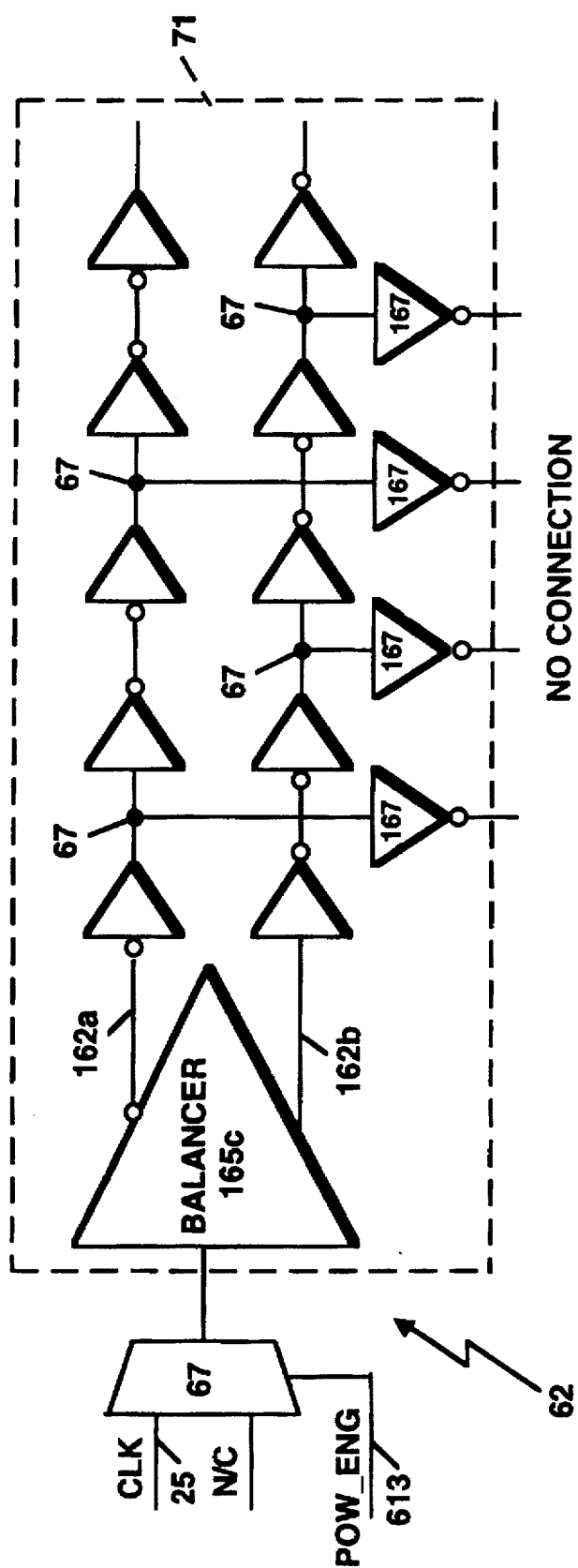

Preferably, the delay lines 72 and 73 are fine-grain delay lines as shown in FIG. 6 along with the stabilizer delay line 71, and the control muxes 65, 66 and 67 respectively. The delay lines, for example 72, comprises two strings 160a, 160b of cascaded inverters, with strings 160a, 160b having taps 67 placed at the outputs of alternating inverter-pairs 170. This arrangement generates a digital signal at each tap output that represents propagation time in terms of a unit delay time interval, while maintaining the correct polarity from the delay line. Each of the taps 67 is coupled to a respective input 164 of a measurement latch and decoder circuits 68 or 69 respectively. In addition, a first input terminal 164a of the measurement latch circuit 66 is tied to a hardwired logical "1", e.g., $V_{DD}$. The input terminal 164a is coupled to latch cell 0, i.e., bit 0, of the measurement latch portion of circuits 68 or 69 and is always forced to a logic "1" so as to resolve a peculiar boundary condition inherent in this remote delay regulation technique: the situation where the clock signal at the point-of-use is already in phase with the reference clock signal. This situation will be discussed further below.

Specifically, the taps 67 emanating from the outputs of inverter-pairs 170 define a time interval of measurement and delay insertion that avoids circuit anomalies caused by process variations by cancelling the propagation asymmetry effects of these variations. Yet, pairing of inverters does not achieve the smallest interval or grain of time logically provided by a single inverter element. Therefore, the taps 67 from each cascaded string 160a,b are alternated at the input terminals 164 of the measurement latch and decoder circuit 66 to achieve the effects of single inverter granularity, thereby yielding a higher degree of resolution.

The delay lines are driven by balancer circuits 165a, 165b and 165c that generate two logically opposing signals having substantially no skew; each opposing signal is provided to one inverter string. The resulting delay line has single-inverter granularity with alternate taps, but no phase reversal, i.e., no inversion.

Figure 13:
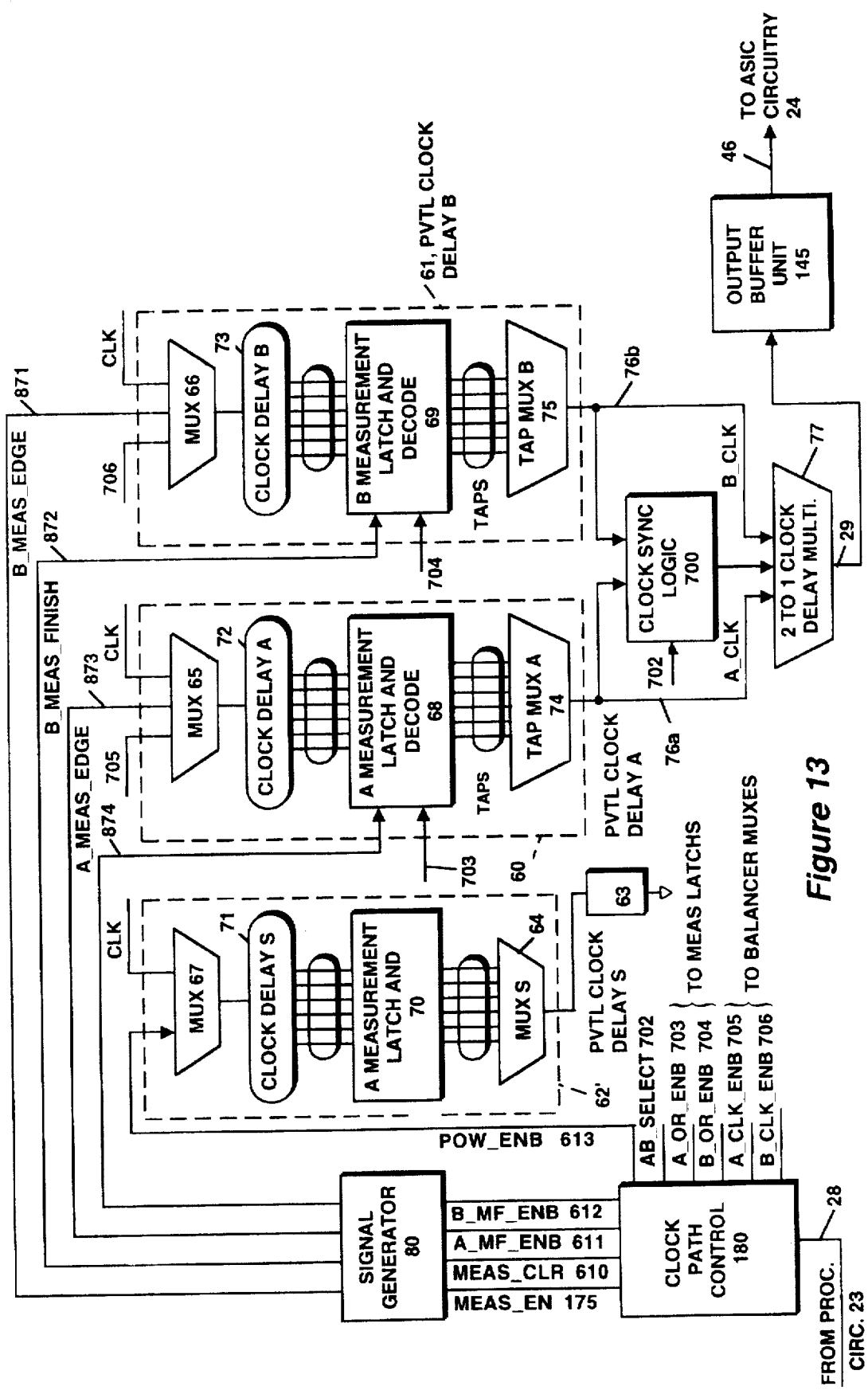
FIG. 13 is an alternative embodiment of a PVTL clock delay circuit of the delay regulator showing an improved power balancer circuit.

Although the stabilizer delay line 62 has no necessary connections to latch circuitry, and is shown with floating terminals in this embodiment of the invention, it is possible to enhance the power replication accuracy of delay line 62 by the inclusion of the latches and loads as shown in FIG. 13 below.

Figure 7:
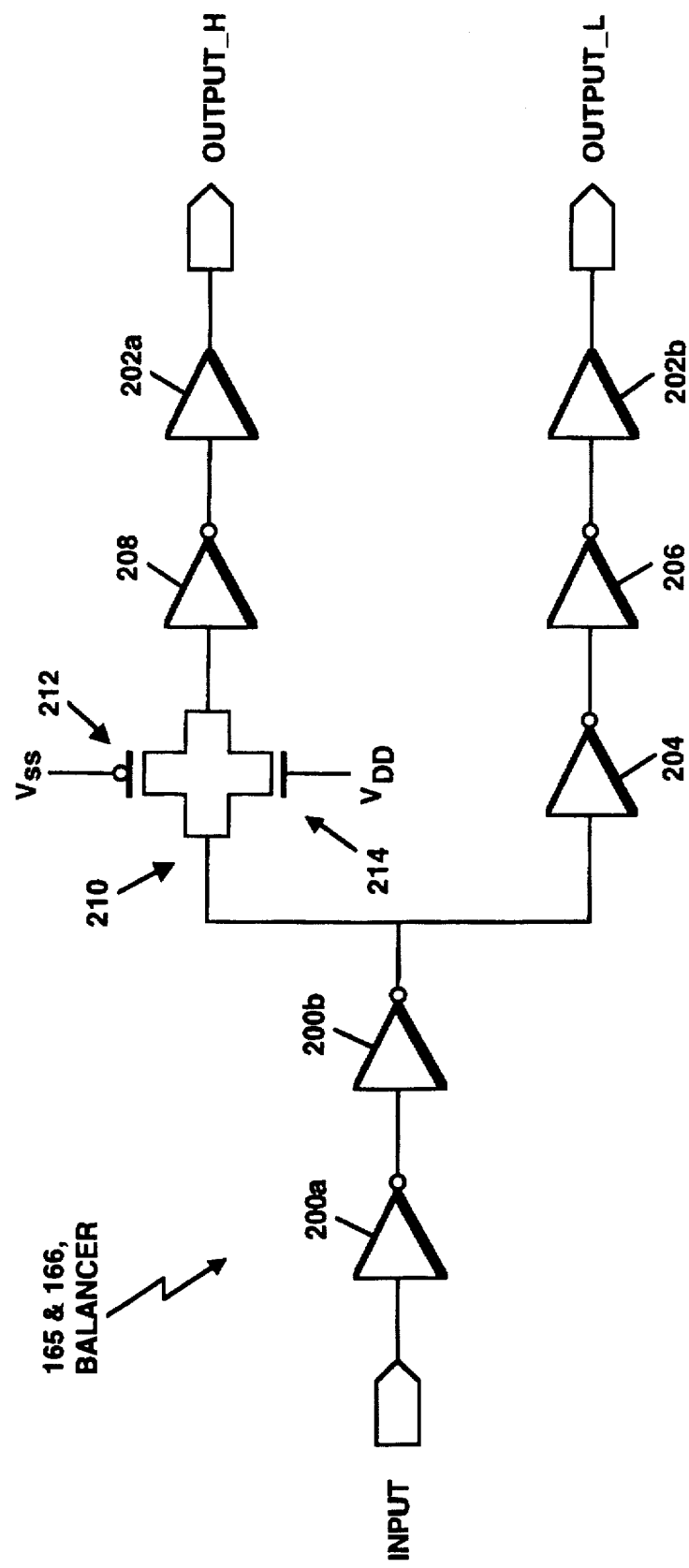
FIG. 7 is a diagram of an embodiment of a balancer circuit used in connection with the present invention.

An example of a balancer circuit 165 is shown in FIG. 7. The circuit 165 receives a single-ended INPUT signal and produces two complementary output signals, OUTPUT_H and OUTPUT_L signals. The circuit includes a pair of input buffers 200a,b, a pair of output buffers 202a,b and three inverters 204, 206 and 208, together with a PMOS device 212 and an NMOS device 214 arranged in a back-to-back pass transistor configuration 210. The latter configuration is used to create a non-inverting delay path with propagation delays similar to that of the opposing inverter path. By driving both the inverting and non-inverting paths from a common source to a common receiver, the resulting "balanced" circuit 165 minimizes fabrication variations, i.e., process corner variations, and generates output signals with substantially no skew therebetween. Because each delay line in this invention has its own dedicated balancer circuit 165, process induced delays related to variations in process fabrication parameters is eliminated.

Specifically, the gates of the devices in the pass transistor configuration are tied to their respective "rail" voltages, i.e., the gate of NMOS device 214 tied to $V_{DD}$ and the gate of the PMOS device 212 tied to $V_{SS}$, so that the devices are placed in their saturation regions and thus resemble active resistors. Tuning of the pass gate configuration 210 involves an RC relationship determined by the width/length ratios (P and N devices). The geometry of the gates is selected such that the intrinsic delay through them is equivalent to the delay through the opposing inverter 204.

Referring again to FIG. 5, the results of the measurement are loaded into the measurement latch and decoder circuits 68 and 69 where they are decoded by an internal decoder circuit. In addition to the control registers, each delay unit 60 and 61 includes a clock delay line 72 and 73 and a tap select multiplexer 74 and 75. The clock delay lines 72 and 73 receive an input system clock signal from control muxes 65 and 66 respectively. The use of two delay adjusting units 60 and 61, i.e., "double-buffering", allows the delay regulator to adjust the clock signal in one of the units by adding the desired delay, while the other unit still compensates for the previously-measured intrinsic delay of the extended path. This technique contributes, in part, to a non-interrupted delay-regulated, output clock signal.

The content of each delay control register 68 or 69 enables a respective A or B tap select multiplexer 74 or 75, to select an appropriate tap from its associated clock delay line 72 or 73. As mentioned above, the A and B delay lines 72 and 73 preferably comprise two strings of cascaded inverters employing three hundred and twenty-four taps. The selection of a tap imparts a desired amount of delay to the input system clock signal.

The resulting output clock signals, i.e., A_CLK on line 76a and B_CLK on line 76b, from the multiplexers 74 and 75 are coupled to a two-to-one clock delay multiplexer 77 that is enabled by clock synchronization logic circuit 700. Here, one of the clock signals is selected and forwarded via a delay-regulated clock path 29 to the output buffer unit 145 for distribution to ASIC circuitry 24 on the module. Selection, i.e., switching, between the clock signals is based upon a control signal, AB_SELECT, on line 702 originating from the clock path control logic unit 180, described below in connection with FIG. 9.

Figure 8:
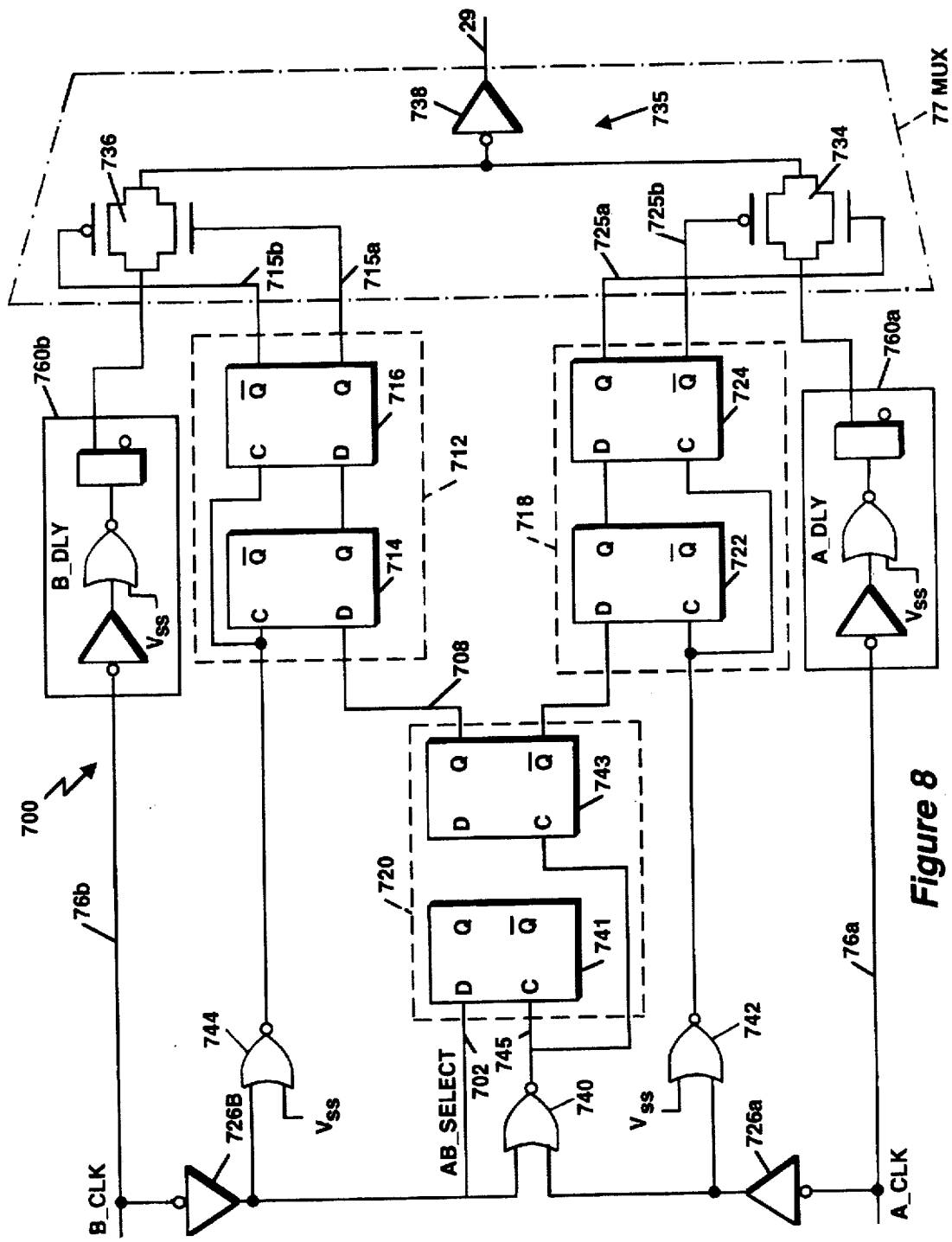
FIG. 8 is a circuit schematic of a synchronization logic circuit used in connection with the present invention.

The synchronization logic circuit 700, shown in FIG. 8, synchronizes signals having different timing domains to a single, common time domain. For example, the clock path control logic unit 180, which generates the AB_SELECT signal based on a non-delayed input clock signal on line 28, operates in a timing domain that is different from that of the delay-regulated clock signals. These latter signals, A_CLK on line 76a and B_CLK on line 76b, are separately generated clock streams that are mostly overlapping, but that have a worst-case regulation accuracy, i.e., non-overlapping streams, equal to one unit (inverter) delay of the clock delay circuit 60 or 61.

Referring now to FIG. 8, the clock synchronization logic circuit 700 synchronizes the signals using a "load cancellation" technique described below. In general, the clock synchronizer logic circuit 700 includes a two-stage synchronization unit for generating enable signals to select an output signal from among multiple input clock signals of the delay multiplexer 77. A pre-synchronization logic stage 720 receives at its inputs the AB_SELECT signal on line 702 and an AB_CLK signal on line 745, while delivering at its outputs signals on lines 708 and 710. The AB_CLK signal is the output of a NOR gate 740 having as inputs the A_CLK and B_CLK clock signals on lines 76a and 76b, respectively, driven, via drivers 726a,b, from respective A and B tap multiplexers 74, 75 (FIG. 5).

Each synchronization circuit is configured as a "dual-rank" synchronizer, i.e., arranged in a back-to-back, flip-flop configuration. Preferably, the flip-flops are D-type "master-slave" units with the slave latch connected to the output of the master latch.

Specifically, the AB_SELECT signal on line 702 is fed to the D-input of a first flip-flop 741 of the pre-synchronization logic unit 720; the Q-output of the flip-flop 741 is tied to the D-input of a second flip-flop 743. Both "ranks" of the pre-synchronization unit 720 are clocked by the AB_CLK signal on line 745. The Q-output on line 708 of the flip-flop 706 is fed to the D-input of a first flip-flop 714 of the B clock synchronization unit 712, while the Q-output of the flip-flop 714 is coupled to the D-input of a second flip-flop 716. The outputs of the second flip-flop 716 are B SELECT selection enable signals on lines 715a,b. The B clock synchronization unit 712 is clocked by a modified B_CLK signal, i.e., the B_CLK signal after passing through NOR gate 744. The modified B_CLK signal is nearly in-phase with the AB_CLK signal on line 745.

Similarly, the NQ-output on line 710 of the flip-flop 743 is fed to the D-input of a first flip-flop 722 of the A clock synchronization unit 718; the Q-output of the first flip-flop 722 is coupled to the D-input of a second flip-flop 724. The outputs of the second flip-flop 724 are A_SELECT selection enable signals on line 725a,b. Both "ranks" of the clock synchronization unit 718 are clocked by the A_CLK signal modified by NOR gate 742. The A_CLK signal at the output of NOR gate 742 is also nearly in-phase with the AB_CLK signal 745.

Functionally, the NOR gate 740 combines the time domains of the A_CLK and B_CLK signals for synchronization with the AB_SELECT signal at synchronizer 720. On the other hand, the NOR gates 742,744 ensure that the time domains of the clock signals entering the pre-synchronization stage 720 are the same as the time domains of those clock signals entering the synchronizers 712 and 718.

The A_SELECT and B_SELECT signals are coupled to transfer gate circuits 734 and 736, respectively, of the clock delay multiplexer 77, which operates in a timing domain different from the above synchronizers. The inputs of the transfer gates 734, 736 are connected to outputs of delay networks 760a,b, described below, while the outputs of the gates are connected to a driver 738. The gates and driver 738 are arranged in a "wire OR" configuration 735 to perform the multiplexer function. The states of the select signals control the outputs of the gates 734 and 736 as the clock delay multiplexer 77 switches between its respective input signals A_CLK on line 76a and B_CLK on line 76b. Specifically, output switching occurs on command from the AB_SELECT signal on line 702 and before a rising edge of the output signal on line 29.

In accordance with the load cancellation technique, delay networks, A_DLY 760a and B_DLY 760b, are added to the A_CLK and B_CLK signal paths, respectively, in order to bring the A and B clock synchronizer units 718, 712 and the multiplexer 77 into a common timing domain. Specifically, each delay network comprises circuits equivalent to the NOR gates 742,744, the drivers 726b,a and second stages, i.e., the "slave" stages, of the master-slave flip-flops 716, 724, respectively. This ensures that the output clock signal on line 29 does not "glitch" when the clock delay multiplexer 77 switches from one input signal to the other in higher frequency applications, e.g., 200 MHz.

Referring again to FIG. 6, the first input terminal 164a of the measurement latch portion of circuits 68 and 69 are tied to $V_{DD}$ to resolve a "boundary condition" that occurs when the clock signal at the point-of-use is already in phase with the reference clock signal. In this boundary condition case, each latch cell of the measurement latch and decoder circuits 68 and 69 capture a logical "0", because no delay adjustment is required. When the contents of the latch cells are decoded by the internal Johnson-style decoder, the resulting decoded signals select a tap 67 from the clock delay line 72 and no clock signal transcends the multiplexer. Therefore, no clock signal emanates from the output buffer unit 145 (FIG. 2) and the computer system 10 (FIG. 1) "shuts-down". Obviously, this is undesirable.

To avoid a boundary condition situation, a logic "1" is always forced into bit 0 of the measurement latch portion of circuits 68 and 69 (FIG. 5). Typical delay measurements will generate at least one logical "1" for storage in the latch portion of the circuits 68 and 69. If the boundary condition is encountered, the forced "1" in the bit 0 latch cell will enable the least significant tap, i.e., tap 0, on the clock delay line 72 and 73. This circuit feature allows for "auto ranging" of the remote delay regulator, i.e., handling of the boundary condition without adding insertion delay.

A clock path control logic unit 180 controls the operation of the remote delay regulator 22. The control logic unit 180, shown in FIG. 9, comprises registers and combinational logic configured to produce a sequential logic circuit, i.e., a "state machine". In general, the state machine transitions unconditionally through four states, i.e., RESET, GEN_ENABLE, WRITE_AB_REG and TOGGLE_AB_SEL during a measurement cycle, while operating synchronously to the input clock signal on line 28. The functions performed and signals generated during each of the four states are as follows:

1. RESET: generates the signal MEAS_CLR on line 610 to clear the signal generation circuitry which, in turn, clears the measurement latch;
2. GEN_ENABLE: generates the signal MEAS_EN on line 175 for the signal generation circuitry;
3. WRITE_AB_REG: generates the signals A_OR_ENB on line 703, B_OR_ENB on line 704, and POW_ENB on line 613, to write the measurement word into either the A or B register and to trigger the power equalizer circuit; and
4. TOGGLE_AB_SEL: generates the control signal AB_SELECT on line 702 to toggle the clock delay multiplexer and select either the A_CLK or B_CLK signals, generates A_CLK_ENB on line 705, and B_CLK_ENB on line 706 to enable the correct active timing mux 65 or 66, and it generates A_MF_ENB on line 611, and B_MF_ENB on line 612, which go to the signal generator 80 and there produce A_MEAS_EDGE on line 873 and B_MEAS_EDGE on line 871 in concert with MEAS_CLR and MEAS_EN mentioned above.

In an exemplary embodiment of the control logic unit 180, the state machine includes one 15-bit Johnson counter 182 cascaded with a 2-bit binary counter 184 and thereafter coupled to a state decoder and synchronizer circuit 186. Specifically, the Johnson counter 182 comprises fifteen D-type flip-flops configured as a shift register with the Q (bar) output of the last flip-flop tied to the data input of the first flip-flop. The 2-bit binary counter 184 comprises two D-type flip-flops and the synchronizer circuit 186 includes a plurality of dual-rank synchronizer circuits. A toggle flip-flop, included within the synchronizer circuit 186, operates to designate which delay line 72 or 73 is selected to make the next insertion delay measurement and which unit is to generate the output clock signal on line 29 (see FIG. 5) based on the previous measurement.

Figure 10:
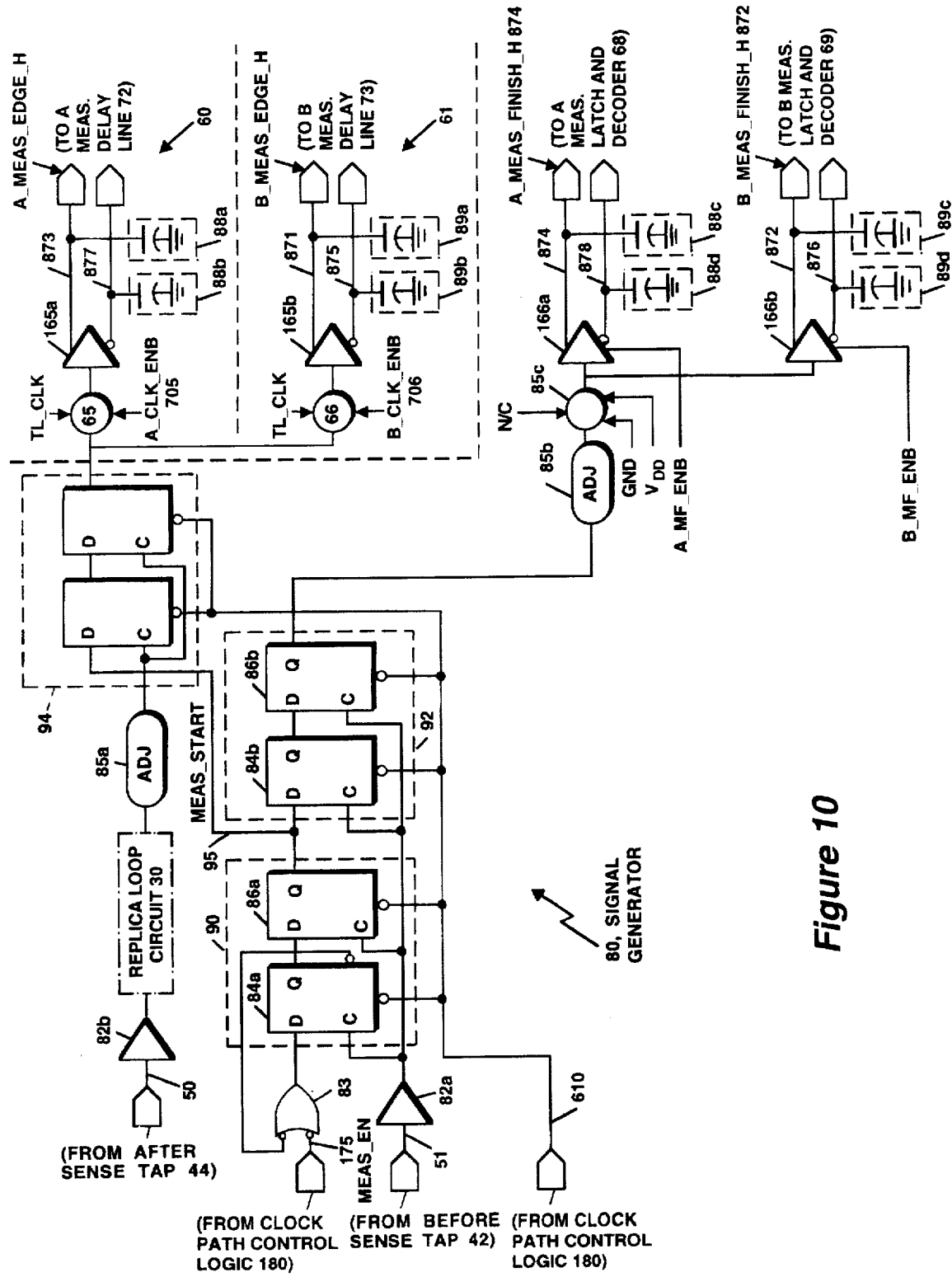
FIG. 10 is a block diagram of a signal generation circuit of the delay regulator.

FIG. 10 illustrates an embodiment of the signal generation circuit 80 of the remote delay regulator 22, which comprises dual-rank synchronizers 90, 92 and 94. The primary purposes of the signal generation circuit 80 are (i) to precisely define a delay regulation measurement period at the frequency of circuit operation and (ii) to precisely define a signal within this period that is used to measure the inherent delay of the extended clock distribution path. Specifically, the rising edges of a MEAS-START signal on line 95 and MEAS_FINISH signals on lines 872 and 874 define the beginning and end of a delay regulation measurement cycle, while the signals MEAS_EDGE on lines 871 and 873 provide the basis for the measurement.

As noted, the state machine generates various control and timing signals such as MEAS_CLR and MEAS_EN. Specifically, the measurement enable signal MEAS_EN is approximately thirty system clock cycles in duration and is used in conjunction with the signal generation circuit 80 to generate the MEAS_START and MEAS_FINISH signals. The signal generation circuit 80 thus eliminates the need for a measurement pulse generator of the type disclosed in the above-mentioned article.

Since it is based upon the system clock signal, MEAS_EN must be synchronized to a time domain that reflects the delay introduced by the extended clock distribution path. That time domain is the BEFORE clock time domain and synchronization is performed with the synchronizer circuits.

Each synchronizer includes two D-type flip-flops 84 and 86 arranged in a back-to-back configuration. Specifically, the BEFORE clock signal on line 51 from the sense tap 42 enters the portion of the remote delay regulator located on the repeater chip 20 through an input buffer 82a and is provided to the clocking input terminals of the flip-flops 84a and 86a of the synchronizer 90. The MEAS_EN signal on line 175 is provided to the data input terminal of the first flip-flop 84a, whose output is coupled to the data input terminal of the second flip-flop 86a. The output of this latter flip-flop is the MEAS_START signal on line 95, which is then provided to the data input terminals of synchronizers 92 and 94.

The flip-flops constituting the synchronizers 90, 92 and 94 operate on only one signal edge. The edge is preferably the rising of the signal, but it could also be falling edge, depending upon the system requirements. In this manner, all the flip-flops "feel" the same, thereby eliminating any effects of fabrication process tolerances.

The BEFORE clock signal on line 51 is also provided at the clocking terminals of the flip-flops of synchronizer 92, the output of which is connected to the inputs of the balancer circuits 166a and 166b via an adjustment delay circuit 85b and a constantly on control mux 85c. The balancer circuits 166a and 166b (see FIG. 7), together with signals A_MF_ENB and B_MF_ENB, produce logically opposing signals A_MEAS_FINISH and B_MEAS_FINISH that are then provided to the measurement latch and decoder circuits 68 and 69 (FIG. 5), as described further below.

The AFTER clock signal on line 50 enters the remote regulator through an input buffer 82b and then propagates through the replica loop circuit 30. The output of the replica loop 30 is coupled to the clocking input terminal of flip-flop 84c of the synchronizer 94 via an adjustment delay circuit 85a. The functions and contents of the adjustment delay circuits 85a,b are described below in connection with FIGS. 11 and 12. The output of flip-flop 86c is connected through a control muxes 65 or 66, to balancer circuits 165 (see FIG. 7), that produce the complementary, logically opposing signals MEAS_EDGE.

In order to provide an accurate measurement of the PVTL delay introduced by the ASIC and repeater chips, the phase relationship between the BEFORE and AFTER clock signals must be maintained throughout the signal generation circuit 80 and, furthermore, must be identical to the phase relationship between the MEAS_EDGE and MEAS_FINISH signals. Unavoidable delays, introduced by the second stage of the flip-flop 86a and the first stage of the flip-flop 84c, distort this required relationship. Therefore, adjustment delay circuits ADJ 85a and 85b, comprising portions of a transparent latch circuit, are used to offset these delays. The constantly on mux 85c compensates for the delay introduced by control muxes 65 and 66.

Figure 11:
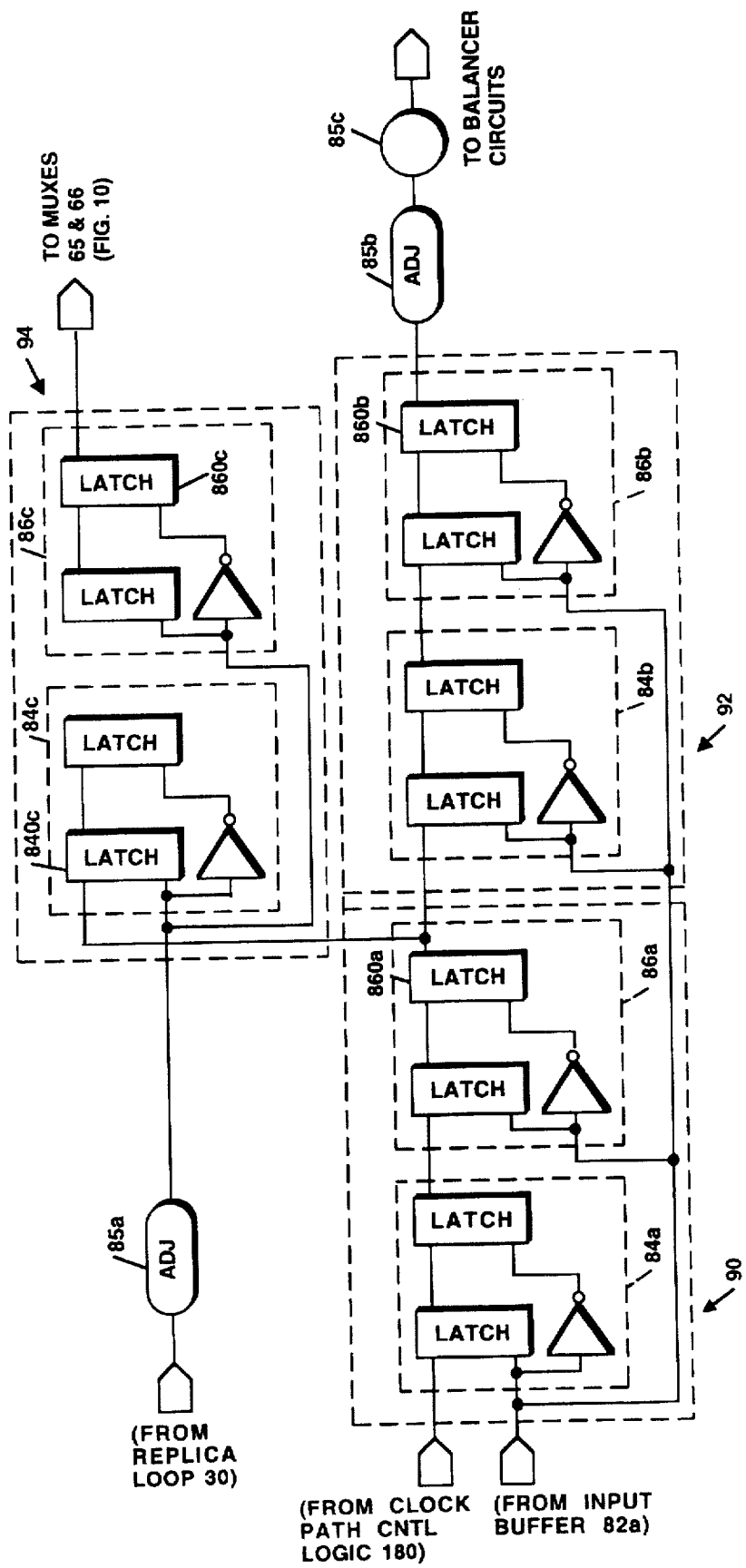
FIG. 11 is a circuit level diagram of a synchronizer portion of the signal generation circuit of FIG. 10.

Referring now to FIG. 11, the synchronizer portion of the signal generation circuit 80 just discussed is shown, now including each flip-flop of the synchronizers that comprise the two latches, arranged in a master/slave configuration. The clocking input-to-Q output portion of the latch 860a and the data input-to-slave output portion of the latch 840a constitute timing delays that are unavoidable if the function of the signal generation circuit 80 is to be realized. Specifically, these latch circuits disrupt the phase relationship between the BEFORE and AFTER clock signals, and the signals they generate, because the delays that the latches introduce are not "offset" by equivalent delays in the circuit 80. Accordingly, the adjustment delay circuits 85 are inserted into the circuit 80 to maintain the relative phase relationship of these signals up to their points of destination, i.e., the measurement delay line and measurement latch.

Figure 12:
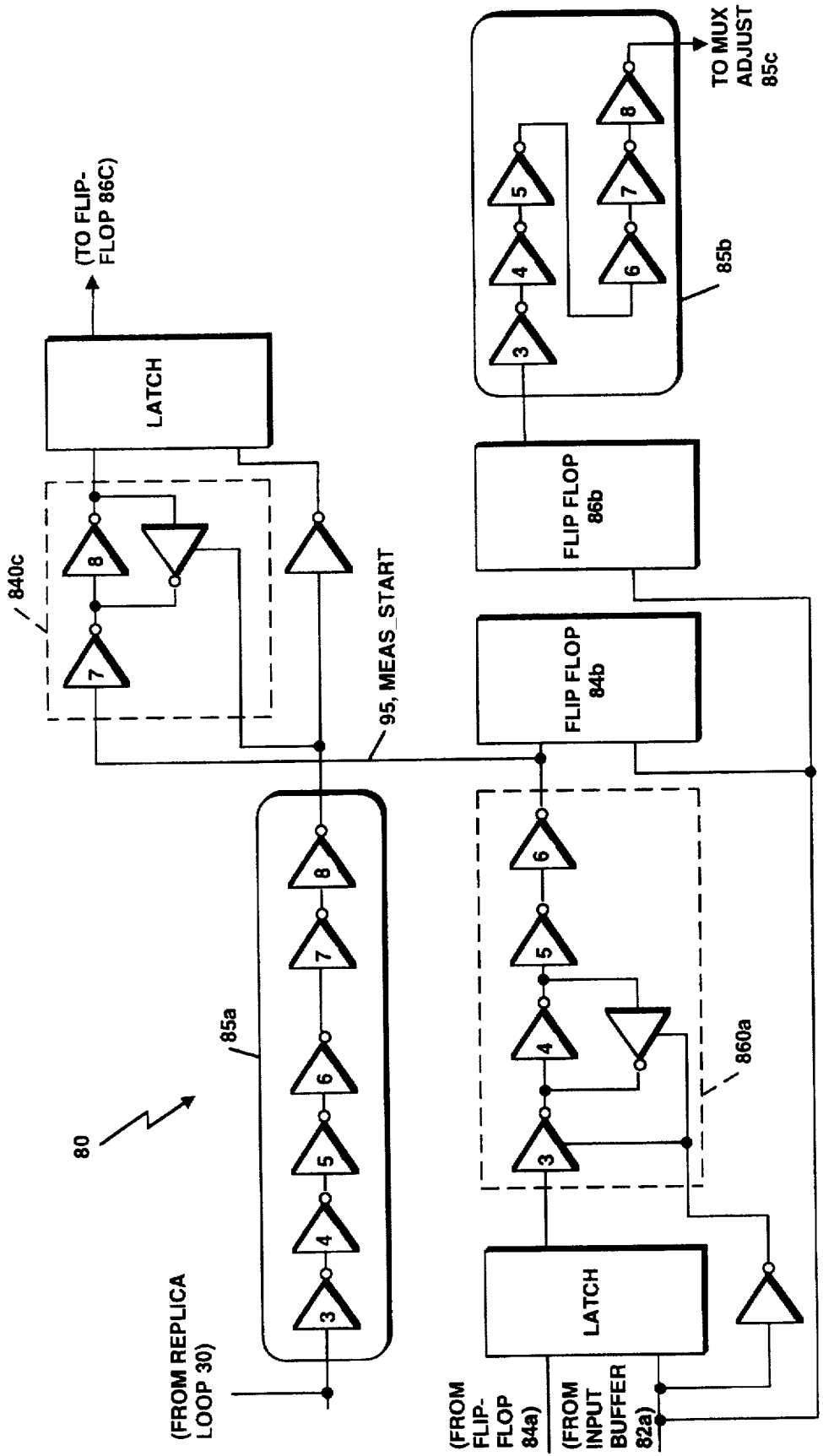
FIG. 12 is a schematic diagram showing adjustment delay circuits added to the signal generation in accordance with the invention.

Referring also to FIG. 12, the inherent timing delays introduced by the clocking input-to-Q output portion of latch 860a is represented by a four-inverter error delay <3-6>; these delay elements are reproduced in the adjustment delay circuit 85a.

It is not known when the MEAS_START signal will appear on line 95, within the time domain of the AFTER clock signal, because the relative phase of this latter signal is shifted by the replica loop 30. The set-up and hold times of the latch 840c contribute a two-inverter error delay <7-8> at this latch's data input-to-slave output circuit; this error delay could manifest as a race condition. Accordingly, to overcome this potential race condition the, two-inverter delay elements are similarly reproduced in the adjustment delay circuit 85a.

However, the addition of delay circuit 85a into the signal generation circuit 80 alters the MEAS_START-to-MEAS_EDGE timing interval within the measurement period defined by MEAS_START and MEAS_FINISH. To maintain the required timing interval, therefore generation of the MEAS_FINISH signals must be delayed a period of time equivalent to the delay elements of adjustment delay circuit 85a. Therefore, an adjustment delay circuit 85b, which is electrically equivalent to the circuit 85a, is inserted at the output of the synchronizer 92 (FIG. 11). This preserves the required timing integrity between the clock signals driving the measurement delay line and measurement latch circuits 65 and 66.

Referring again to FIG. 10, the balancer circuits 165a and 165b located at the output of the synchronizer circuit 94 drive the measurement delay lines 72 and 73, and the balancer circuits 166a and 166b drive the banks of individual latches located in the measurement latch portion of circuits 68 and 69. These latter circuits represents a large amount of both line and device capacitance. To offset the capacitive effect of circuits 68 and 69, loading networks 88a,b, and 89a,b, which are preferably capacitors of values equal to at least the measurement latch capacitance of circuits 68 and 69, are placed at the outputs 873 and 877 and outputs 871 and 875 respectively of the balancers 165a and 165b. However, the capacitive loads driven by the balancer circuits 165a and 165b may be different; therefore, "tuning" capacitor networks 88c,d and 89c,d, may be placed at the outputs 874 and 878 and outputs 872 and 876 respectively of circuits 165b and 166b to balance these outputs.

The operation of the remote delay regulator 22 during a delay measurement cycle will now be described with reference to the drawings. Referring here to FIGS. 2 and 10, the BEFORE clock signal on line 51 is routed from the sense tap 42 on the ASIC chip 24 to the signal generation circuit 80 of the remote regulator 22 located on the repeater chip 20 (FIG. 2). Whenever the MEAS_EN signal on line 175 (FIG. 10) is synchronized to the BEFORE time domain and then transformed into a MEAS_START signal on line 95. MEAS_START defines the beginning of a measurement interval.

As noted, the AFTER clock signal on line 50 is provided at a sense tap 44 on the ASIC chip 24 located at the end of the ASIC clock distribution network 45, i.e., at the clock signal's point-of-use 600 (FIG. 4). The skew present in the distribution network thus delays the AFTER signal by some fraction of a system clock cycle and the present invention is specifically directed to regulating this delay. The AFTER signal is routed from the tap 44 to the replica loop circuit 30, where the inherent propagation delay of the delay regulator further delays the signal.

Thereafter, the AFTER signal is provided to the synchronizer 94, which synchronizes the MEAS_START signal to the AFTER clock time domain and eventually generates the MEAS_EDGE signals on lines 873, 877, and lines 871, 875. Referring to FIG. 5, the MEAS_EDGE signals propagate through control muxes 65 and 66 into the tapped measurement delay lines 72 and 73 where a measurement of the intrinsic propagation delays of the extended path encompassing the ASIC chip 24, the repeater chip 20 and the intervening etch line is provided.

It should be noted that only the leading edges of the MEAS_EDGE signals are sent through the tapped delay lines. Meanwhile, synchronizer 92 (FIG. 10) ensures that the measurement latch portions of circuits 68 and 69 are closed one full clock cycle after the assertion of MEAS_START, thereby providing a measurement cycle of one system clock cycle in duration. Thus, when MEAS_START is present at the data input of synchronizer 94, the next two BEFORE clock signals generate MEAS_FINISH signals to close the measurement latch. Two clock signals are required because, as noted, the synchronizer is "dual-ranked". Specifically, the leading edges of the MEAS_FINISH signals are used to close the measurement latch portion of circuits 68 and 69. The digital word captured in the measurement latch reflects an integer number of clock periods minus the delay of the repeater chip 20, the output clock transmission line and the associated ASIC chip's clock distribution network 45 rounded down to the nearest delay line delay unit, e.g., 200 ps.

Referring to FIG. 4, the delay-regulated output signal on line 46 of the repeater chip then drives the remote section 40 of the associated IC chip 24. This delay-regulated signal ensures that the clock signal at the end of the clock distribution network 45, i.e., point-of-use 600, in the IC chip 24 is delayed by approximately one clock period or integral multiple of clock periods. The added delay enables clock signal alignment throughout the system of up to one unit of delay, e.g., 200 ps. Therefore, clock signals with negligible amounts of skew can be achieved throughout the system at the end of all the ASIC chip clock distribution networks. Another requirement of the invention is that each associated IC chip must provide the BEFORE and AFTER sense taps. The technology used in the IC chip may be different from that of the clock repeater chip, provided signal levels are compatible.

While there has been shown and described a preferred embodiment, it is to be understood that various other adaptations and modifications may be made within the spirit and scope of the present invention. For example, the invention is equally applicable to a two-stage delay regulator where the first stage is used to remove the propagation delay variations introduced by the clock repeater chip itself, i.e., a "single-barreled" regulator, and the second stage is "multi-barreled", e.g., several cascaded regulators with parallel inputs and separate outputs. Here, each second stage regulator accommodates a separate associated ASIC chip.

The two-stage regulator requires that the transmission line used to deliver delay-regulated clock signals to the associated IC chip have an electrical length L1 that is consistent throughout the system and equal to the replica loop 30 (FIG. 2) transmission line 47 electrical length L1. Additionally, each associated IC chip has BEFORE and AFTER taps buffered by equivalent output drivers to two transmission lines of electrical length L3, which deliver instances of the delay-regulated clock signals back to the repeater chip. Again, the lengths L3 must be consistent on a per-target basis, although they may differ from one associated IC chip to another.

At the repeater chip, the BEFORE clock signal is routed to a dedicated measurement latch and decoder circuit for each associated IC chip and the AFTER clock signal is routed to a dedicated measurement delay line for each target chip. Specifically, the incoming tap sense clocks are divided by two with toggle flip-flops, e.g., one-bit Johnson counters, to obtain pulses one clock cycle in length before entering the measurement latch or delay line. These clock-period long pulses determine latency deliberately inserted into each associated ASIC clock signal. The BEFORE signal is used to close the measurement latch and the AFTER signal, delayed by the target IC chip's clock distribution network, drives the measurement delay line.

Thus, the first stage of the regulator measures and corrects for delay variations between repeater chips of the system due to PVTL variations, while the second stages measure and correct for the delay of each associated ASIC chip's clock distribution network over PVTL variations.

Referring now to FIG. 13, an alternative embodiment of the PVTL Clock Delay Circuits is shown that has the power stabilizer circuit 62, with a dummy load designed to more closely replicate the power consumption of the two active clock delay line 60 and 61. The dummy load consists of a replica measurement latch 70 designed to replicate active latches 68 and 69, and a replica mux 64 designed to replicate active muxes 74 and 75. The dummy load also comprises an either 'on chip' or 'off chip' loading element designed to replicate the power consumed in driving the wiring going to the remote associated IC, 24, ie line 46. The alternative embodiment of the PVTL Clock Delay Circuits further improves the local transient voltage bounce problem, but does so at the expense of greater chip area.

The foregoing description has been directed to a specific embodiment of this invention. It will be apparent, however, that variations and modifications may be made to the described embodiment, with the attainment of some or all of its advantages. Therefore, it is the object of the appended claims to cover all such variations and modifications as come within the true spirit and scope of the invention.

What is claimed is:

1. An apparatus for reducing clock skew comprising:
   a variable clock delay circuit for measuring and compensating for intrinsic propagation delays of a clock signal path during a measurement cycle, said clock delay circuit configured to receive a system reference clock signal and provide a low-skew, low time offset, clock signal along said clock signal path to point-of-use circuitry on an associated IC chip, said clock delay circuit further comprising:
   a plurality of variable delay lines; and
   means for maintaining a constant power consumption of said clock delay circuit during power up and power down cycles of said variable delay lines.

2. The apparatus of claim 1 wherein said means for maintaining a constant power consumption of said clock delay circuit during internal measurement cycles of said delay lines comprises:
   an additional delay line connected to turn on whenever any of said plurality of delay lines turns off.

3. The apparatus of claim 2 wherein said additional delay line is identical to each of said plurality of delay lines.

4. The apparatus of claim 2 wherein said means for maintaining a constant power consumption of said clock delay circuit during internal measurement cycles of said delay lines further comprises:

a termination coupled to said additional delay line, said termination presenting a load to said additional delay line corresponding to loading presented to each of said plurality of delay lines.

5. The apparatus of claim 4 wherein said termination coupled to said additional delay line equals the loading presented to each of said plurality of delay lines.

6. The apparatus of claim 5 wherein said termination is an 'on chip' termination coupled to said additional delay line.

7. The apparatus of claim 1 wherein said variable clock delay circuits and said means for maintaining a constant power consumption of said variable clock delay circuit are disposed adjacent to each other on a semiconductor substrate.

8. The apparatus of claim 1 wherein each of said variable delay lines use the same circuitry for both measuring said intrinsic propagation delay offset and for imposing a variable delay offset on said clock signal to the point-of-use circuitry.

9. The apparatus of claim 1 further comprising:

a plurality of clock delay circuits disposed upon a single semiconductor device, wherein each of said clock delay circuits further comprises:

for each of said plurality of delay lines a latch coupled to a corresponding one of said plurality of delay lines; and a multiplexer coupled to a corresponding one of said latches.

10. A module comprising:

a clock delay circuit for measuring and compensating for intrinsic propagation delays of an extended clock distribution path during a measurement cycle, and provide a low-skew, low offset clock signal, said clock delay circuit further comprising:

at least one clock repeater chip, each of said at least one clock repeater chips comprising;

a plurality of clock signal delay lines to both measure a current required clock signal delay offset, and to produce a previously measured clock signal delay offset;

means for maintaining a constant power consumption of said clock delay circuit during power up and power down cycles of said delay lines; and at least one remote clock circuit located on said module having a clock path coupled to the clock signal delay lines for measuring actual propagation delay of said extended clock distribution path.

11. The module of claim 10 wherein said low-skew, low offset clock signal has remote point-of-use circuitry connected to the end of said extended clock distribution path, said at least one remote clock circuit receiving the low-skew, low offset clock signal from said clock delay circuit over a first transmission line.

12. The module of claim 11 wherein said remote circuitry contains a signal generation circuit located on the repeater chip and coupled between said clock delay circuit and said at least one remote clock circuit for generating measurement signals that define the beginning and end of the measurement cycle in response to instances of said low-skew, low offset clock signal received from said at least one remote clock circuit over a pair of second transmission lines, with the time between said instances of the low-skew, low offset clock signal representing the propagation delay of the clock distribution path on the associated IC chip.

13. The module of claim 10 wherein each board of said module contains a plurality of said at least one clock repeater chips.

14. The module of claim 13 wherein each board of said module may contain at least one associated IC chip containing at least one of said at least one remote clock circuits for measuring the actual propagation delay effects.

15. The module of claim 10 wherein said module contains a plurality of said clock delay circuits on a single chip, each one of said plurality of clock delay circuits coupled to a corresponding one of a plurality of associated IC chips on said module, each of said plurality of associated IC chips containing one of said at least one remote clock circuits.

16. A module comprising:

a clock delay circuit for measuring and compensating for intrinsic propagation delays of an extended clock distribution path during a measurement cycle, and provide a low-skew, low offset clock signal, said clock delay circuit further comprising:

a plurality of delay lines to both measure a current required clock signal delay offset, and to produce a previously measured clock signal delay offset;

means for maintaining a constant power consumption of said clock delay circuit during power up and power down cycles of said delay lines; and wherein a first IC chip that does not contain a remote clock circuit, has the necessary clock delay imposed by reference to a delay measurement on a second IC chip disposed adjacent to said first IC chip on the module, which said second IC chip does contain a remote clock circuit.

* * * * *